April 27, 1937. B. H. CLEM 2,078,443
OSCILLATING DEVICE FOR EGG CONTAINERS
Filed March 13, 1935
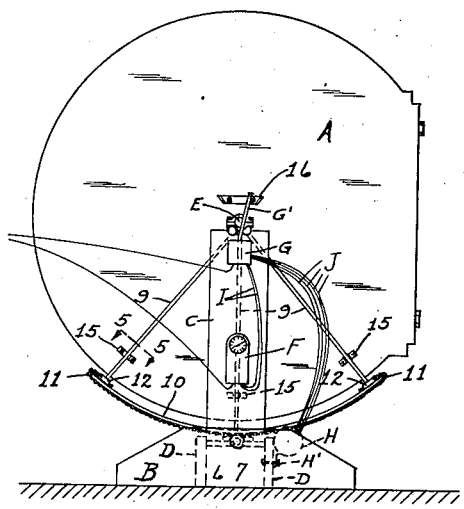
FIG. 1.
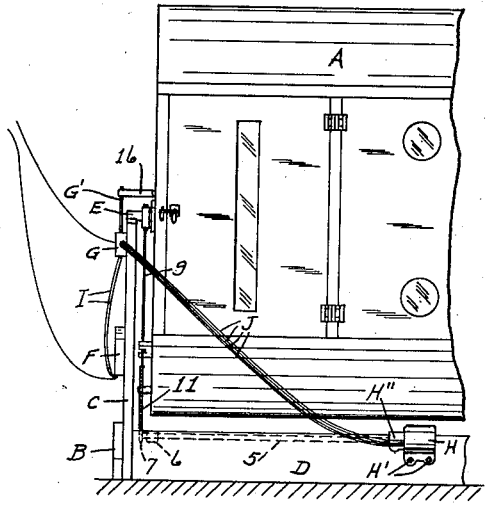
FIG. 2.
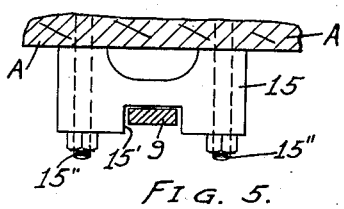
FIG. 5.
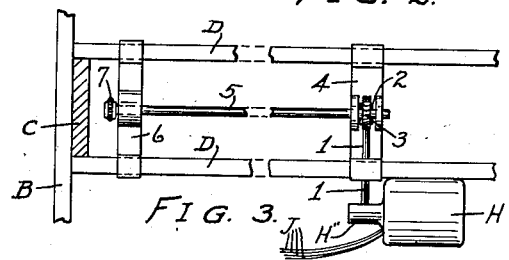
FIG. 3.
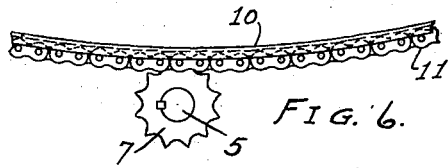
FIG. 6.
FIG. 9.
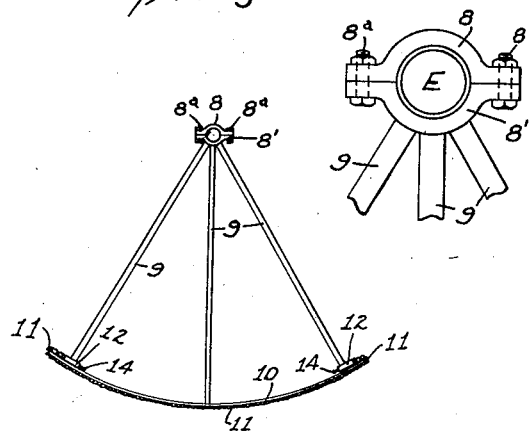
FIG. 4.
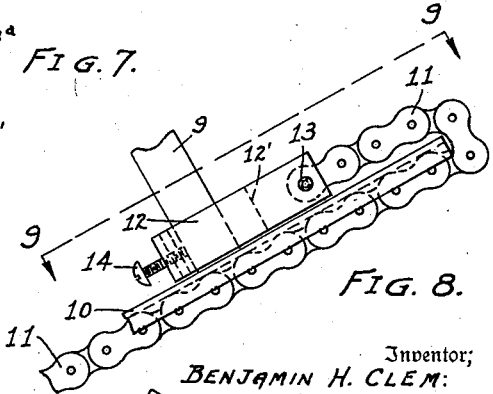
FIG. 7.
FIG. 8.
Inventor;
BENJAMIN H. CLEM
By Robert L. Faudle
and Donald E. Windle
Attorneys Patented Apr. 27, 1937

2,078,443

UNITED STATES PATENT OFFICE 2,078,443

OSCILLATING DEVICE FOR EGG CONTAINERS

Benjamin H. Clem, New Madison, Ohio, assignor of forty-nine per cent to The J. A. Flaig Lumber Co., New Madison, Ohio, a corporation of Ohio Application March 13, 1935, Serial No. 10,875

2 Claims. (Cl. 99—242)

One of the principal objects of my invention is the provision of a mechanism which will automatically oscillate an egg container, or incubator, with a minimum of attention thereto.

Another object of my invention is the provision of an automatic oscillating device which can be cheaply manufactured, which is simply constructed, and which is comprised of a minimum number of parts.

Other objects and advantages of my invention will suggest themselves in the course of the following description, and that which is new will be correlated in the appended claims.

The most satisfactory manner of carrying out the principles of my invention in a practical, economical, comprehensive and efficient manner is shown in the accompanying drawing, in which;

Figure 1 is an end elevation of an egg container, or incubator, showing my device attached thereto.

Figure 2 is a front elevation of an egg container with my device in connection therewith.

Figure 3 is a plan view of the driving mechanism of my device.

Figure 4 is an elevation of the portion of my mechanism which is attached to the end of the egg container.

Figure 5 is a detail section taken on line 5—5 of Figure 1.

Figure 6 is a detail view of the driving sprocket of my mechanism in connection with the chain.

Figure 7 is a detail view of the collar of my device.

Figure 8 is an enlarged detail of the chain securing means.

Figure 9 is a detail section taken on line 9—9 of Figure 8.

Similar indices designate like parts throughout the several views.

In order that the construction, the operation, and the advantages of my invention may be more fully understood and appreciated, I will now take up a detailed description thereof, in which I will set forth the same as fully and as comprehensively as I may.

In the drawing, letter A designates an egg container, or incubator, to which my device is to be attached, the egg container A being of the oscillatory type, is adapted to be oscillated on the shaft E which extends through the egg container and projects beyond each end thereof, and is supported at each end by the upright members C. Supporting the upright members C are the foot members B which are adapted to rest upon a flat surface, such as for instance, a floor. Connecting the members B and C of one end with corresponding members at the opposite end are the sill members D which are secured at their end portions to the respective members B and C.

F designates a time clock, and G designates a reversing switch which is connected with the time clock F by means of the electric wires I. H designates an electric motor which is secured to one of the sill members D by means of the bolts H'. The motor H is connected in series with the time clock F and the reversing switch G by means of the electric wires J. Extending outwardly from one end of the motor H and integrally connected therewith, is the gear housing H'' in which is a worm gear and a companion worm wheel.

Extending from within the housing H'' is the shaft I which extends through its adjacent sill member D, and has the worm gear 2 secured on its projecting end portion. Meshing with the worm gear 2 is the worm wheel 3, the same being secured to one end of the shaft 5 which extends at right angles to the shaft I. The worm gear 2 and the worm wheel 3 are properly supported by means of bearings mounted on the bracket 4. The opposite end of the shaft 5 is supported by the bracket 6 to which is attached a bearing block, through which the shaft 5 extends. The sprocket 7 is secured to the end of the shaft 5, as shown in Figure 3.

Between the upright C and the end portion of the egg container A, and encircling the shaft E are the upper and the lower members 8 and 8' respectively, which are secured together by means of the bolts 8ª, and together forming a collar about the shaft E. The members 8 and 8' being loosely fitted around the shaft E, do not turn with the shaft. Rigidly secured to the member 8' are the radial members 9 which are rigidly secured at their lower ends to the channel member 10. The channel member 10 is formed in the shape of an arc, and is concentric with the shaft E. Removably secured to the member 10 is the chain 11 which is secured at its ends, by means of the U-shaped clamping members 12, to the outermost radial members 9. Located within the members 12 are the smaller U-shaped members 12' which fit snugly around their respective members 9. Extending outwardly from and threaded into the members 12 and 12' are the adjusting screws 14, the same bearing at their inner ends, against their respective members 9. The ends of the chain 11 are secured at the open ends of the U-shaped members 12 by means of the respective rivets 13.

The blocks 15 are rigidly secured through the end portion of the egg container A, and have the channel-shaped apertures 15' formed therein for the reception of the respective members 9. The blocks 15 are secured through the end of the egg container A by means of the bolts 15''.

The operation of my invention, after having been assembled and attached to an egg container of the oscillatory type in the manner shown, is substantially as follows;

The time clock F, the reversing switch G, and the electric motor H are connected in series in an electric circuit. The time clock F, having been set to close the electric circuit at predetermined intervals, makes contact and starts the motor H. The motor, through its reduction gears (enclosed in the housing H''), transmits power through the shaft 1 and the worm gear 2, to the worm wheel 3. The worm wheel 3, being secured to one end of the shaft 5, transmits the power to the sprocket 7. The sprocket 7 transmits the power by means of the chain 11, the channel member 10 and the radial members 9 to the blocks 15. The blocks 15, being secured through the end of the egg container A, cause the egg container A to be oscillated until one of the projecting arms of the member 16 engages the switch lever G'. When the switch lever G' has been thrown to the opposite side, the electric circuit is broken, and the motor H ceases to drive the mechanism. When the switch lever G' is thrown over and breaks the circuit, it automatically sets contacts contained in the switch case G to reverse the succeeding circuit through the motor H. Due to the time clock F being set to close the circuit at predetermined intervals, the length of time elapsing determines the frequency that the motor is energized. With the time clock F, the reversing switch G, and the motor H connected in series, it is possible to predetermine the intervals, and the oscillation of the egg container definitely, and a regularity of oscillation can be obtained thereby which cannot be approached by manually operable means.

I desire that it be understood that minor changes may be made in the several details, and in the arrangement of the parts herein shown and described, without departing from the spirit of my invention or sacrificing any of the advantages thereof which are new and useful, and which involve invention.

Having now fully shown and described my invention, what I claim and desire to secure by Letters Patent of the United States, is—

1. In combination with an egg container positioned around a shaft, an arc-shaped channel member positioned concentrically with relation to said shaft, a removable collar surrounding said shaft, radial members secured at their lower ends to said channel member and secured at their upper ends to said collar, a chain secured at its ends to two of the radial members and extending from end to end of the channel member and on the under side thereof, and means for imparting oscillating movements to all of said members.

2. An electrically controlled and operated egg container, comprising in combination, a horizontally disposed shaft supported between a pair of stationary members, an egg container mounted on said shaft and positioned concentrically therewith, an arc-shaped channel member held in concentric relation with said shaft by means of a plurality of radial members with a chain extending from end to end of said channel member and located on the under side thereof and means for rigidly securing each end of said chain to a respective radial member, and means for transmitting motion from each of said radial members to the egg container.

BENJAMIN H. CLEM.